US012743696B2

(12) United States Patent
Wokaty, Jr.

(10) Patent No.: US 12,743,696 B2
(45) Date of Patent: Sep. 22, 2026

(54) SYSTEMS AND METHODS FOR AUTHORIZING AGE-RESTRICTED INTERACTIONS

(71) Applicant: Capital One Services, LLC, McLean, VA (US)

(72) Inventor: Robert Dwane Wokaty, Jr., Glen Allen, VA (US)

(73) Assignee: Capital One Services, LLC, McLean, VA (US)

(*) Notice: Subject to any disclaimer, the term of this patent is extended or adjusted under 35 U.S.C. 154(b) by 488 days.

(21) Appl. No.: 18/162,738

(22) Filed: Feb. 1, 2023

(65) Prior Publication Data

US 2024/0257196 A1 Aug. 1, 2024

(51) Int. Cl.
*G06Q 20/40* (2012.01)
*G06Q 20/42* (2012.01)
*G06Q 30/0601* (2023.01)

(52) U.S. Cl.
CPC ....... *G06Q 20/40145* (2013.01); *G06Q 20/42* (2013.01); *G06Q 30/0607* (2013.01)

(58) Field of Classification Search
CPC ........... G06Q 30/0607; G06Q 30/0609; G06Q 30/0623
See application file for complete search history.

(56) References Cited

U.S. PATENT DOCUMENTS 8,355,992 B1 * 1/2013 Haugh .................. G06Q 20/20 705/64
9,665,896 B2 5/2017 Atikoglu et al.
10,304,101 B2 * 5/2019 Zhao .................... G06Q 20/204
11,188,913 B2 11/2021 Cao
11,599,670 B1 * 3/2023 Ketharaju ............... G06F 21/32
11,734,737 B2 * 8/2023 Agarwal .......... G06Q 20/40145 705/26.25
11,977,658 B1 * 5/2024 Ketharaju .............. G06F 21/50
(Continued)

OTHER PUBLICATIONS

Developing secured biometric payments model using Tokenization (Year: 2015).*
(Continued)

*Primary Examiner* — Gautam Ubale
(74) *Attorney, Agent, or Firm* — Bookoff McAndrews, PLLC

(57) ABSTRACT

Disclosed are methods and systems for authorizing age-restricted interactions. A first request may be received at an interaction authorization system from a computing device based on the computing device detecting (1) an age restriction associated with an interaction and (2) a certification mechanism for age validation associated with an account. The first request may include an account identifier, where the account is identified from a data store using the identifier to receive an age identifier of the account holder stored in association with the account. A first message including the age identifier may be generated and provided to the computing device for use in determining the account holder's age meets the age restriction. Based on the determination, a second request may be received at the interaction authorization system from the computing device to approve the interaction, and a responsive second message indicating an interaction approval may be generated and provided.

19 Claims, 5 Drawing Sheets

(56) References Cited

U.S. PATENT DOCUMENTS

| | | | | |
|---|---|---|---|---|
| 2008/0265020 | A1* | 10/2008 | Copeland | G06Q 20/12 235/380 |
| 2009/0063312 | A1 | 3/2009 | Hurst | |
| 2014/0180807 | A1* | 6/2014 | Boal | G06Q 30/0251 705/14.53 |
| 2016/0239887 | A1* | 8/2016 | Zhao | G06Q 30/0607 |
| 2016/0307196 | A1* | 10/2016 | Achhra | G06Q 20/3821 |
| 2016/0342993 | A1* | 11/2016 | Morgan | G06Q 20/3276 |
| 2016/0371694 | A1* | 12/2016 | Zito | G06Q 20/204 |
| 2017/0359408 | A1* | 12/2017 | Kurian | G06Q 10/10 |
| 2019/0050921 | A1* | 2/2019 | Ryner | G06Q 20/326 |
| 2019/0065919 | A1* | 2/2019 | Maheshwari | G06K 19/0718 |
| 2019/0378098 | A1* | 12/2019 | Lam | G06Q 20/027 |
| 2020/0005295 | A1* | 1/2020 | Murphy | G06Q 20/405 |
| 2021/0241287 | A1* | 8/2021 | MacKinnon | G06Q 20/12 |
| 2021/0390556 | A1* | 12/2021 | Bermudez | G06Q 20/405 |
| 2022/0188833 | A1* | 6/2022 | May | G06Q 20/40145 |
| 2022/0245690 | A1* | 8/2022 | Ryner | G06Q 20/3224 |

OTHER PUBLICATIONS

An_Intelligent_Shopping_Cart_with_Automatic_Product_Detection_and_Secure_Payment_System (Year: 2019).*

Nathaniel Meyersohn, "Nobody likes self-checkout. Here's why it's everywhere," CNN Business, retrieved from https://www.cnn.com/2022/07/09/business/self-checkout-retail/index.html#:~:text=Self%2Dcheckout%2C%20however%2C%20was,article%20in%20the%20Miami%20Herald on Jan. 31, 2023.

Margaret Thacker, "3 Ways Self-Checkout Saves Grocers Money," ITRetail, retrieved from https://www.itretail.com/blog/3-ways-self-checkout-saves-grocers-money on Jan. 31, 2023.

Ben Dwyer, "Self Checkout: Should You Implement It?," CardFellow, retrieved from https://www.cardfellow.com/blog/self-checkout-should-you-implement-it/ on Jan. 31, 2023.

Alina Dizik, "Yes, Self-Checkout Machines Encourage Shoplifting. Here's Why Stores Love Them Anyway," Money, retrieved from https://money.com/shelf-checkout-encourages-shoplifting/ on Jan. 31, 2023.

* cited by examiner

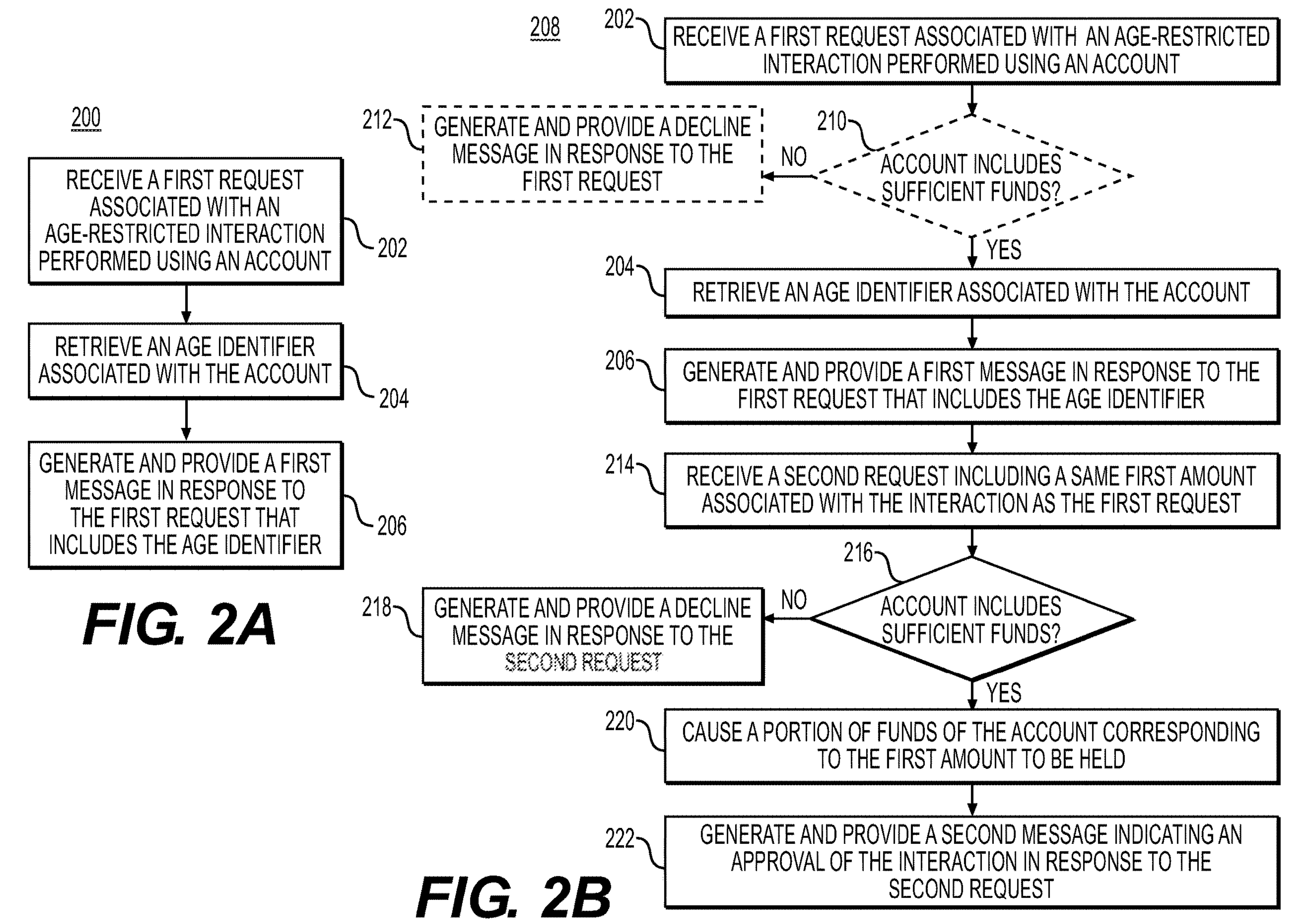
200
RECEIVE A FIRST REQUEST ASSOCIATED WITH AN AGE-RESTRICTED INTERACTION PERFORMED USING AN ACCOUNT
202
RETRIEVE AN AGE IDENTIFIER ASSOCIATED WITH THE ACCOUNT
204
GENERATE AND PROVIDE A FIRST MESSAGE IN RESPONSE TO THE FIRST REQUEST THAT INCLUDES THE AGE IDENTIFIER
206
FIG. 2A
208
202
RECEIVE A FIRST REQUEST ASSOCIATED WITH AN AGE-RESTRICTED INTERACTION PERFORMED USING AN ACCOUNT
212
GENERATE AND PROVIDE A DECLINE MESSAGE IN RESPONSE TO THE FIRST REQUEST
NO
210
ACCOUNT INCLUDES SUFFICIENT FUNDS?
YES
204
RETRIEVE AN AGE IDENTIFIER ASSOCIATED WITH THE ACCOUNT
206
GENERATE AND PROVIDE A FIRST MESSAGE IN RESPONSE TO THE FIRST REQUEST THAT INCLUDES THE AGE IDENTIFIER
214
RECEIVE A SECOND REQUEST INCLUDING A SAME FIRST AMOUNT ASSOCIATED WITH THE INTERACTION AS THE FIRST REQUEST
216
ACCOUNT INCLUDES SUFFICIENT FUNDS?
NO
218
GENERATE AND PROVIDE A DECLINE MESSAGE IN RESPONSE TO THE SECOND REQUEST
YES
220
CAUSE A PORTION OF FUNDS OF THE ACCOUNT CORRESPONDING TO THE FIRST AMOUNT TO BE HELD
222
GENERATE AND PROVIDE A SECOND MESSAGE INDICATING AN APPROVAL OF THE INTERACTION IN RESPONSE TO THE SECOND REQUEST
FIG. 2B

SYSTEMS AND METHODS FOR AUTHORIZING AGE-RESTRICTED INTERACTIONS

TECHNICAL FIELD

Various embodiments of this disclosure relate generally to techniques for authorization of interactions, and, more particularly, to systems and methods for authorization of age-restricted interactions.

BACKGROUND

Increasingly, merchants are utilizing technology to accommodate customer preferences of limited human-to-human interaction, as well as to fill voids created by labor shortages. For example, many merchants provide computing systems to enable customers to perform self-checkout or self-entry at physical locations and/or now offer purchase of items online. However, certain interactions between customers and merchants may be age-restricted based on state laws, federal laws, and/or merchant preferences in view of such state and federal laws. For example, access to physical and/or virtual locations, such as bars, venues, websites, etc., may be restricted to customers who are of a minimum age. Similarly, purchase of certain types of items, such as fireworks, tobacco, alcohol, etc. may be restricted to customers who are of a minimum age.

Merchants bear the responsibility of verifying that a customer's age meets the respective minimum age before proceeding with and/or completing the interaction. Therefore, conventionally, a human-to-human interaction between the customer and a representative of the merchant (e.g., an employee or a third party delivery service in the online context) may be performed to validate the customer's age. For example, when a customer is utilizing a computing system to perform self-checkout, the representative may be notified if the customer is attempting to purchase an age-restricted item, the customer may present an identification card that includes a date of birth (DOB), and the representative may input the DOB into the computing system. The computing system may then determine whether the customer's age meets the minimum age associated with the age-restricted item.

Such human-to-human interaction to assist in the age validation process obviates at least some of the advantages and appeal of implementing technology such as self-checkout computing systems. Additionally, the identification card presented by the customer often includes other personal information of the user, such as a driver's license number, an address, a height, a weight, etc. that, for privacy reasons, the customer may prefer that the representative not view. Further, presentation of the identification card may leave the customer vulnerable to nefarious capture and use of the information by the representative or other customers nearby that may be able to view the information thereon.

This disclosure is directed to addressing the above-referenced challenges, among other challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for authorization of age-restricted interactions. The methods and systems may enable use of an age validation-enabled account as a certification mechanism for age validation when performing age-restricted interactions.

According to one aspect, an exemplary method may include receiving a first request from a computing device in response to the computing device detecting (1) an age restriction associated with an interaction, and (2) a certification mechanism for age validation associated with an account. The first request may include an identifier of the account. The method may also include using the identifier to identify the account from a data store configured to store information associated with the account, including an age identifier of a holder of the account, receiving the age identifier from the data store, and generating and providing, to the computing device, a first message responsive to the first request that includes the age identifier. The computing device determines an age of the holder of the account meets the age restriction based on the age identifier, and in response to the determination by the computing device, the method may further include receiving a second request from the computing device, and generating and providing, to the computing device, a second message responsive to the second request indicating an approval of the interaction.

According to another aspect, an exemplary method may include receiving a first request from a computing device to initiate a first authorization process in response to the computing device detecting (1) one or more age-restricted items associated with an interaction, and (2) a certification mechanism for age validation associated with an account. The first request may include an identifier of the account and a first amount associated with the interaction. The method may also include using the identifier to identify the account from a data store configured to store information associated with the account, including an age identifier of a holder of the account, receiving the age identifier from the data store, and generating and providing, to the computing device, a first message responsive to the first request that includes the age identifier. The computing device may determine whether an age of the holder of the account meets a minimum age for each of the one or more age-restricted items based on the age identifier, and the method may further include determining whether to continue with the first authorization process based on an indication of the determination received from the computing device. The first authorization process may be continued when, in response to the computing device determining the minimum age is met, a second request including the same first amount associated with the interaction included in the first request is received as the indication from the computing device. Continuing the first authorization process may include causing a portion of funds of the account corresponding to the first amount to be held, and generating and providing a second message to the computing device responsive to the second request indicating an approval of the interaction. The first authorization process may be ceased when, in response to the computing device determining the minimum age is not met for at least one of the one or more age-restricted items, no request or a third request including a second amount associated with the interaction different from the first amount included in the first request is received as the indication from the computing device.

According to a further aspect, an exemplary method, executed on a computing device, may include detecting an age-based restriction associated with an interaction, detecting a certification mechanism for age validation associated with an account used to perform the interaction, receiving an identifier of the account, and generating and providing a first request to an interaction authorization system that includes the identifier of the account. The method may also include receiving, from the interaction authorization system, a first message responsive to the first request that includes an age identifier of a holder of the account, determining an age of the holder of the account meets the age-based restriction based on the age identifier, and in response to the determination, generating and providing a second request to approve the interaction to the interaction authorization system. The method may further include receiving, from the interaction authorization system, a second message responsive to the second request indicating an approval of the interaction, and completing the interaction based on the approval.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 2A-2C depict flowcharts of exemplary processes implemented by an interaction authorization system for authorizing an age-restricted interaction, according to certain embodiments.

DETAILED DESCRIPTION OF EMBODIMENTS

Figure 1:
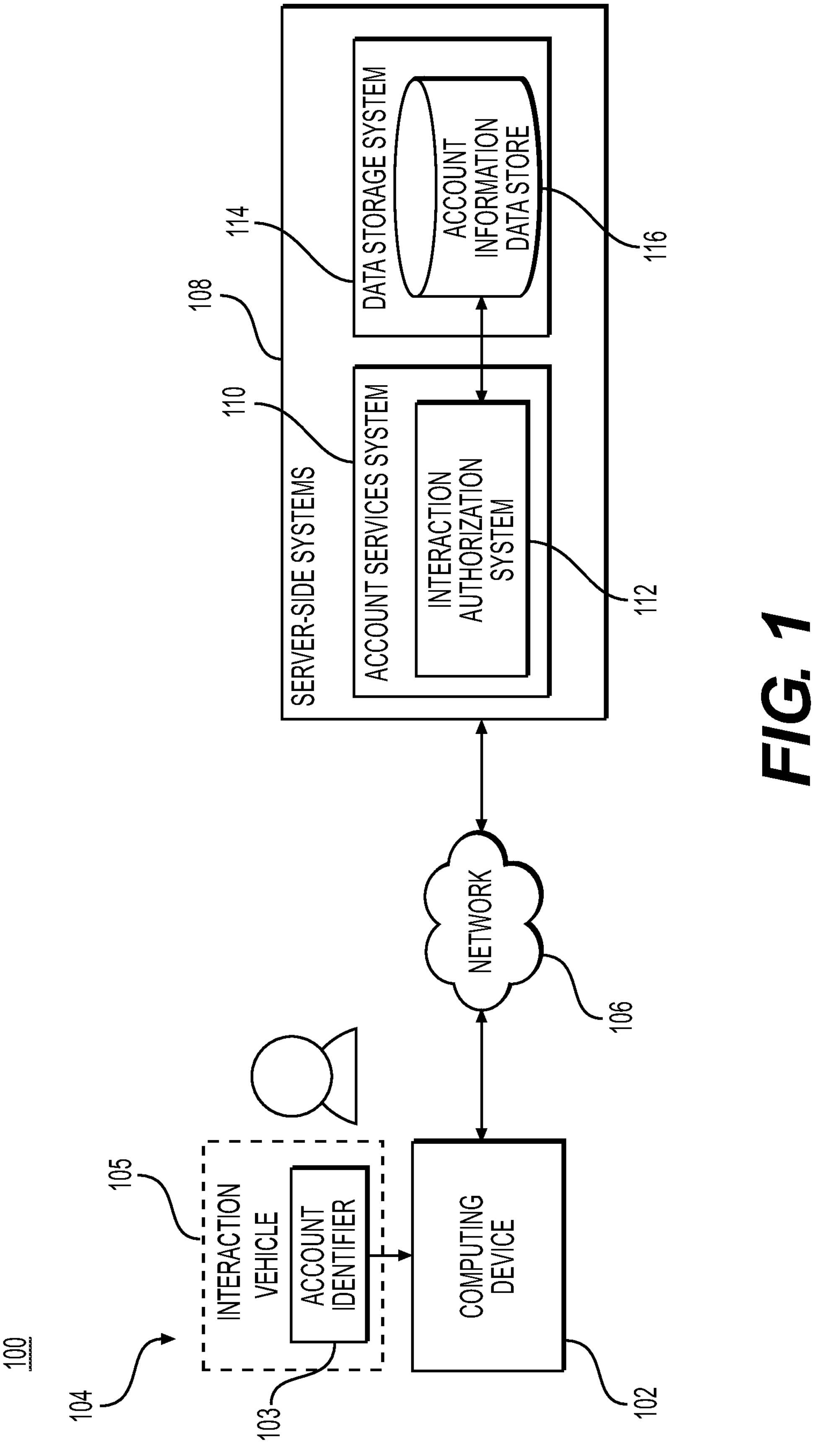
FIG. 1 depicts an exemplary environment for authorization of age-restricted interactions, according to certain embodiments.

According to certain aspects of the disclosure, methods and systems are disclosed for authorization of age-restricted interactions. As will be discussed in more detail below, in various embodiments, systems and methods are described for using an age validation-enabled account as a certification mechanism for age validation when performing age-restricted interactions, such as gaining age-restricted access to physical or virtual locations and/or purchasing age-restricted items.

Reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Similarly, the term "or" is intended to mean "and/or," unless explicitly stated otherwise. Relative terms, such as, "substantially" and "generally," are used to indicate a possible variation of ±10% of a stated or understood value.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. Specifically, an "account services provider" may be an entity or person involved in providing account services to a plurality of users (e.g., account holders), the account services including age validation services, biometric authentication services, etc. In some examples, the account services may be associated with financial accounts and the account services provider may be associated with a financial institution. As used herein, terms like "account holder", "account user", or "user" generally encompass any person or entity that may have an account and consume account services from the account services provider. This person or entity may also be engaging in an interaction with a merchant separate from the account services provider. In some examples, the account services may be consumed via an application. The term "application" may be used interchangeably with other terms like "program," or the like, and generally encompasses software that is configured to interact with, modify, override, supplement, or operate in conjunction with other software.

The term "certification mechanism for age validation" as used herein generally encompasses a specific type of account issued by the account services provider, such as an age validation-enabled account, that authorizes sharing of age-identifying information of a user for age validation or verification purposes as part of an interaction authorization process. In some examples, the specific type of account may be identified based on an account identifier. An "account identifier" may be an identifier of the account, such as the account number. In some examples, the account identifier or data representative thereof may be associated with and/or stored (e.g., in a memory of) an interactive vehicle, such as a smart card, a token, etc. that is issued to the user by the account services provider when the account is opened.

A "terminal" as used herein generally encompasses any computing device that is configured to facilitate an interaction between a user and a merchant. The terminal may be a physical terminal or a virtual terminal. An "interaction" may include a payment transaction (e.g., involving the transfer of funds) or a nonpayment transaction of goods or services between the user and the merchant. An exemplary nonpayment transaction may include access to a location of the merchant, where the location may be a physical location and/or a virtual location (e.g., a website). An "age-restricted interaction" as used herein may be one example type of interaction between the user and the merchant for which the merchant is responsible for verifying that an age of the user meets a predefined minimum age required to allow the interaction. The term "age identifier" as used herein generally encompasses any age-identifying information of the user, such as a DOB, a current age, etc., that may be utilized to verify that the age of the user meets the predefined minimum age required to allow the age-restricted interaction.

As discussed above in the background, merchants are increasingly utilizing technology, such as self-checkout computing systems, to accommodate customer preferences of limited human-to-human interaction, as well as to fill voids created by labor shortages. However, certain interactions between customers and merchants may be age-restricted, and merchants bear the responsibility of verifying that a customer's age meets a minimum required age before proceeding with and/or completing the interaction. Therefore, conventionally, a human-to-human interaction between the customer and a representative of the merchant is often performed to verify the customer's age, obviating some of the advantages and appeal of utilizing technology, such as self-checkout computing systems, and exposing more personal information of the customer to the representative or others nearby than necessary.

The United States Patriot Act of 2001 introduced and mandated know your customer (KYC) regulations for financial institutions. To comply with these KYC regulations, financial institutions are required to collect information from customers that enable the financial institutions to verify the customers' identity, including DOB. By implementing techniques to enable a financial institution to supply the customer's DOB to a terminal as part of an authorization process for an interaction performed using an account issued by the financial institution, the present disclosure may solve one or more of the problems set forth above and/or other problems, as well as generally improve upon the conventional systems and methods for authorizing age-restricted interactions.

In an exemplary use case, certain aspects may enable use of an age validation-enabled account as a certification mechanism for age validation during an authorization process associated with an age-restricted interaction. For example, a terminal may facilitate an interaction between a user or holder of the account and a merchant. When the terminal detects an age-based restriction associated with the interaction and the certification mechanism for age validation, the terminal may provide an identifier of the account, along with other interaction-related information, as part of a first preauthorization request to an interaction authorization system to initiate a first authorization process. The first authorization process may be a type of authorization process specific to age-restricted interactions. In some examples, the interaction may be a payment-related interaction in which one or more age-restricted items of the merchant are attempted to be exchanged for funds from the account of the user. In other examples, the interaction may be an access-based interaction in which the age restriction is associated with access to a physical and/or virtual location of the merchant, and the account is only being used for age validation (e.g., as opposed to age validation and a method of payment). The interaction authorization system may use the account identifier to obtain and return an age identifier, such as the user's DOB, associated with the account in a responsive, first preauthorization message.

The terminal may use the age identifier included in the first preauthorization message to determine whether the user's age meets a minimum age associated with the age restriction. In some examples, when the interaction is an access-based interaction and the user's age meets the minimum age, a duplication check may be performed by the terminal using the account identifier to confirm the account had not been previously used within a predefined time period to obtain access. Duplication may be indicative of the user fraudulently providing their account information to another user for use in gaining access, and thus cause the interaction to be declined or otherwise flagged if the account identifier is a duplicate. If the account identifier is a non-duplicate, no further steps may be performed and the age restriction authorization process may be completed.

In other examples, when the interaction is a payment-related interaction and the user's age meets the minimum age, the terminal may generate a second authorization request that includes the same interaction-related information as the preauthorization request (e.g., because no age-restricted items need to be removed, etc.). Based on the same interaction-related information included in the second authorization request, the interaction authorization system may continue with the first authorization process. For example, the interaction authorization system may perform one or more authorizations and/or evaluations associated with sufficiency of funds to cover an amount of the interaction, an identity of user, and/or fraud indicators, and generate a responsive, second authorization message indicating approval of the interaction upon a positive outcome of the authorization and/or evaluations. The terminal may complete the interaction based on the approval.

Alternatively, the terminal may determine that the user's age does not meet the minimum age based on the age identifier received in the first preauthorization message. In some examples, a representative of the merchant may be notified and may interact with the terminal to void or remove the age-restricted item from the interaction. In one example, if the age-restricted item was the only item associated with the interaction (e.g., there are no remaining items in a payment-related interaction and/or the interaction was access-based), no interaction remains, and thus any further authorization processes may cease.

In another example, if one or more other items are associated with the interaction, but none of those items are age-restricted, a second authorization process different from the first authorization process may be initiated. For example, the interaction authorization system may receive a third authorization request generated by the terminal that includes different interaction-related information from the first preauthorization request provided in the first authorization process (e.g., because the age-restricted item was voided or removed from the interaction). The third authorization request may be processed by the interaction authorization system by performing one or more authorizations and/or evaluations associated with sufficiency of funds to cover an amount of the interaction (if any), an identity of user, and/or fraud indicators. The interaction authorization system may then generate a responsive, third authorization message indicating approval of the interaction upon a positive outcome of the authorization and/or evaluations. The terminal may complete the interaction based on the approval.

In a further example, if one or more of the other items are associated with an age restriction, another first authorization process may be performed. That is, the first authorization process specific to age-restricted interactions may be repeated. For example, a new preauthorization request may be generated by the terminal to which the interaction authorization system responds to with a responsive, new authorization message, and so on.

Utilizing the above-described techniques, performing age validation for age-restricted interactions may be increasingly automated (and fully automated when the user is of appropriate age) to limit human-to-human interactions and streamline the use of automated checkout and/or access computing systems. Additionally, only the age identifier of the user may be provided to the terminal for the age determination (e.g., the minimum information necessary), making the user's personal information less vulnerable to nefarious capture and use.

While the specific examples included throughout the present disclosure involve financial accounts enabled to perform age validation, it should be understood that techniques according to this disclosure may be adapted to other types of accounts that may be used to establish membership or other similar status, where such membership or status may be associated with age-restricted access and/or monetary or nonmonetary exchange of age-restricted items. It should also be understood that the examples above are illustrative only. The techniques and technologies of this disclosure may be adapted to any suitable activity.

FIG. 1 depicts an exemplary environment 100 for authorization of age-restricted interactions, according to certain embodiments, and which may be used with the techniques presented herein. A computing device 102 may communicate with one or more of the other components of the environment 100 across electronic network 106, including one or more server-side systems 108 associated with a provider (e.g., an account services provider).

The server-side systems 108 may include an account services system 110 and/or a data storage system 114, among other systems. The account services system 110 may include one or more sub-systems or components, such as an interaction authorization system 112. The data storage system 114 may include a plurality of data stores, including an account information data store 116, among other data stores. In some embodiments, the account services system 110 and the data storage system 114 may be associated with a common entity, e.g., the account services provider, or the like. In such embodiments, the account services system 110 and/or data storage system 114 may be part of a cloud service computer system (e.g., in a data center). In other embodiments, one or more of the components of the environment 100 may be associated with a different entity than another. For example, one or more of the sub-systems of the account services system 110 (e.g., the interaction authorization system 112) may be associated with a third party that provides interaction authorization services to the account services provider. As another example, the data storage system 114 may be associated with a third party that provides data storage services to the account services provider. The systems and devices of the environment 100 may communicate in any arrangement. As will be discussed herein, systems and/or devices of the environment 100 may communicate in order to enable authorization of age-restricted interactions, among other activities.

The computing device 102 may serve as a terminal associated with a merchant to facilitate interactions between users and the merchant. For example, the computing device 102 may be configured to interact with other systems in the environment 100 to request authorization of interactions, including age-restricted interactions, between users and the merchant, and complete (e.g., process) the interactions once authorized. In some examples, the computing device 102 may be a computer system such as, for example, a desktop computer, a laptop computer, a tablet, a smart cellular phone, a smart watch or other electronic wearable, etc. Additionally, the computing device 102 may be integrated within a kiosk, a self-checkout system, an automated access system (e.g., automatic turnstile, gate, barrier-type system), or other similar system. In some examples, representatives of the merchant may operate the computing device 102. Additionally or alternatively, the users that are involved in the interactions with the merchant may operate the computing device 102 (e.g., if the computing device 102 is integrated within the kiosk, self-checkout system, automated access system, or other similar system). Further, if a user performs online interactions with the merchant, the computing device 102 may be a computing device of the user.

The computing device 102 may communicate with one or more of the server-side systems 108 over the network 106 to prompt an interaction authorization process. For example, when an age-restricted interaction and a certification mechanism 104 for age validation are detected by the computing device, the computing device 102 may generate and provide a series of one or more requests to the interaction authorization system 112 to initiate one or more authorization processes. As described in detail elsewhere herein, the number and type of requests generated by the computing device 102 as part of the authorization process(es) may depend on whether an age restriction placed on the interaction is removed or maintained based on an age of the user, and if maintained, whether there are other items and/or other age-restricted items that remain associated with the interaction. An age validation-enabled account of the user that is issued by the account services provider may be used as the certification mechanism 104 for age validation. In some examples, and as described in detail elsewhere herein, the certification mechanism 104 may be represented or identified by an account identifier 103 of the account. Additionally, in some examples, the account identifier 103 may be associated with and/or stored in (e.g., stored in a memory of) an interactive vehicle 105 provided by the account services provider to the user upon opening of the age validation-enabled account.

In some embodiments, the computing device 102 may include one or more electronic application(s), e.g., a program, plugin, browser extension, etc., installed on a memory of the computing device 102. In some embodiments, the electronic application(s) may be associated with one or more of the other components in the environment 100, such as an application that is configured to communicate with one or more of the server-side systems 108. For example, the application may be executed on the computing device 102 to enable interaction with the interaction authorization system 112. In some examples, the application may be a thick client application that is installed locally on the computing device 102 (e.g., a desktop application or mobile application). In other examples, the application may be a thin client application (e.g., a web application) that is rendered via a web browser launched on the computing device 102.

Additionally, one or more components of the computing device 102 may generate, or may cause to be generated, one or more graphic user interfaces (GUIs) based on instructions/information stored in the memory, instructions/information received from the other systems in the environment 100, and/or the like and may cause the GUIs to be displayed via a display of the computing device 102. The GUIs may be, e.g., mobile application interfaces or browser user interfaces and may include text, input text boxes, selection controls, and/or the like. The display may include a touch screen or a display with other input systems (e.g., a mouse, keyboard, etc.) for an operator of the computing device 102 to control the functions of the computing device 102.

The computing device 102 may be configured to receive the account identifier 103 of the account that is being used to perform an interaction, and such receipt may trigger communication with the one or more server-side systems 108 to perform an interaction authorization process. The account identifier 103 may be an identifier of the account issued to a user by the account services provider. As part of the process to open the account, information associated with the user, including a name, a DOB, an identity number, and/or biometric data may be collected and stored in association with the account in the account information data store 116. In some examples, the account services provider may be a financial institution, and the account may be a financial account, such as a credit card account, a debit card account, etc. The account identifier 103 may include an account number, such as a credit card number or a debit card number, or a token representing the account number, such as a virtual card number.

The account services provider may provide additional services, such as age validation services and/or biometric authentication services, which the user may opt-in to and/or otherwise have associated with the account. For example, the account may be an age validation-enabled account that authorizes at least a portion of the user's information associated with the account, such as the user's DOB, to be shared to perform age validation. That is, the age validation-enabled account may be used as a certification mechanism 104 for age validation. For example, as part of the process to open the account, the user may select to opt-in to an age validation service or otherwise authorize the sharing of the user's DOB when age-restricted interactions are performed using the account. In some examples, the account services system 110 may request for the user to confirm an accuracy of the user's DOB that is stored in association with the account as part of the opt-in process.

Accordingly, in examples where the interaction is an age-restricted interaction performed using the account, the user's DOB may be provided to a terminal facilitating the interaction, such as the computing device 102, to perform age validation. For example, the computing device 102 may store logic locally in a memory of the computing device 102 that enables the computing device 102 to detect an item having an age restriction and identify a minimum age associated with the age restriction. When the account is an age validation-enabled account, the computing device 102 may generate and send a preauthorization request to the interaction authorization system 112 that causes provision of the user's DOB to the computing device 102. The computing device 102 may also store logic that computes the user's age based on the user's DOB such that the computing device 102 can determine whether the user's age meets the minimum age identified by the computing device 102.

As another example, the account may also be a biometric authentication-enabled account that uses biometric data as an additional layer of authentication when authorizing interactions performed using the account (e.g., to confirm the actor performing the interactions is in fact the user and not a fraudulent or unauthorized actor). For example, as part of the process to open the account, the user may select to opt-in to a biometric authentication service or otherwise request that the account services provider perform biometric authentication as part of the interaction authorization process when interactions are performed using the account.

An initial portion of the account identifier 103 generated by the account services provider may be a bank identification number (BIN) that identifies at least the issuer of the account (e.g., the account services provider) and an account type (e.g., credit card account, debit card account, etc.). Additionally, the BIN may be specific for age validation-enabled accounts of a given account type and/or for biometric authentication-enabled accounts of a given account type. The BIN may be used by the computing device 102 to route requests to an appropriate system of an issuer of the account (e.g., to the interaction authorization system 112) of the account services provider. The remaining portion of the account identifier 103 may be a unique portion that is assigned by the account services provider to the user.

In some examples, the account identifier 103 may be received as input, among other account related information (e.g., expiration date, CVC, etc.) to the computing device 102. For example, when the interaction being performed is an online interaction between a user and the merchant, the user may provide the account identifier 103 as input into a hosted payment form and/or cart displayed on a user interface of a merchant application through which the interaction is being performed. In other examples, the environment 100 may optionally include the interactive vehicle 105 that is presented to the computing device 102 to perform the interaction, and read by the computing device 102 to obtain the account identifier 103, among other account information.

As briefly mentioned above, the interactive vehicle 105 may be issued by the account services provider to the user associated with the account (e.g., upon the user opening the account). The interactive vehicle 105 may be any interactive vehicle, such as a card, token, a Universal Serial Bus (USB) key, a radio frequency identification (RFID) card, or other similar object that is configured to store the account identifier 103 and/or data representative the account identifier 103, among other account related information. In some examples, the account identifier 103 or data representative thereof may be stored on a magnetic strip of the interactive vehicle 105 and/or in a memory of an integrated chip (IC) embedded in the interactive vehicle 105. Additionally, the interactive vehicle 105 may be enabled with near-field communication (NFC) technology (e.g., is NFC-enabled). Resultantly, when the magnetic strip is swiped or a portion of the interactive vehicle 105 including the chip is inserted into and/or positioned within a proximity (if NFC-enabled) of the computing device 102 or an accessory device associated with the computing device 102 (e.g., a pin pad and/or card reader), the computing device 102 may read the account identifier 103, among other account related information.

In some examples, the interactive vehicle 105 may also optionally include a biometric scanning device integrated therein. For example, if the account is a biometric authentication-enabled account, the interactive vehicle 105 issued to the user may include the integrated biometric scanning device. The biometric scanning device may be configured to capture and generate a representation (e.g., a binary representation) of biometric data of an actor performing the interaction, which may be compared to the user's biometric data collected and stored in the account information data store 116 as part of the interaction authorization process in order to determine whether there is a match. The types of biometric data received may include data obtained from the user's fingerprint(s), face, voice, iris, palm, finger geometry (e.g., a size or position of fingers), vein(s), and/or the like. In some examples, more than one type of biometric data may be captured for the user. In one non-limiting example, the biometric scanning device may include an optical sensor with a charge-coupled device (CCD) camera configured to capture an image of the user's fingerprint, and an image processing system configured to generate a binary representation of the fingerprint from the image.

The account services system 110 may include one or more server devices (or other similar computing devices) for executing various account services of the account services provider. As one example, the account services system 110 may enable the user to, among other account-related tasks, open accounts of varying types that may be used in conjunction with one or more services, such as the age validation and/or biometric authentication services, as described in detail above. As another example, responsive to one or more requests from a terminal, such as the computing device 102, the interaction authorization system 112 of the account services system 110 may approve and/or decline an interaction attempted to be performed using the account (e.g., based on sufficiency of funds in the account). Additionally, when the account is also an age validation-enabled account and the interaction is an age-restricted interaction, the interaction authorization system 112 may provide the user's DOB to the terminal for use in determining whether the user's age meets a minimum age associated with the restriction. Further, when the account is also a biometric authentication-enabled account in addition to or separate from the age validation-enabled account, the interaction authorization system 112 may compare biometric data received from the terminal (e.g., the biometric data captured by the biometric scanning device integrated into the interactive vehicle 105) to the biometric data of the user stored in the account information data store 116.

The data storage system 114 may include a server system or computer-readable memory such as a hard drive, flash drive, disk, etc. In some embodiments, the data storage system 114 includes and/or interacts with an application programming interface for exchanging data to other systems, e.g., one or more of the other components of the environment, such as at least the interaction authorization system 112 of the account services system 110. In some examples, the data storage system 114 may be a sub-system or component of the account services system 110 (e.g., when the data storage system 114 is also provided by the account services provider rather than a third party). The data storage system 114 may include and/or act as a repository or source for various types of account-related data. For example, the data storage system 114 may include a plurality of data stores, including an account information data store 116, among other data stores.

The account information data store 116 may include account information associated with each of a plurality of accounts issued by the account services provider. The account information for a given account may include both account-related information and user-related information for one or more users associated with the given account. Exemplary account-related information may include the account identifier 103, an expiration date, a card verification code (CVC), a current balance of the account, a limit associated with the account, any usage-based restrictions associated with the account, etc. Exemplary user-related information for each associated user may include a name, contact information, a DOB, biometric data (e.g., if the account is biometric authentication-enabled account), etc. that may be obtained by the account services system 110 when opening the account and/or when opting into services, such as the age validation and/or biometric authentication services.

When the interaction authorization system 112 receives the one or more requests from the computing device 102, the interaction authorization system 112 may generate and submit one or more queries to the account information data store 116 to obtain portions of the account and/or user-related information for the account stored therein to perform the interaction authorization process, as described in detail elsewhere herein.

The network 106 over which the one or more components of the environment 100 communicate may include one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 106 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like. The computing device 102 and one or more of the server-side systems 108 may be connected via the network 106, using one or more standard communication protocols. The computing device 102 and the one or more of the server-side systems 108 may transmit and receive communications from each other across the network 106, as discussed in more detail below.

Although depicted as separate components in FIG. 1, it should be understood that a component or portion of a component in the system of exemplary environment 100 may in some embodiments, be integrated with or incorporated into one or more other components. For example, the data storage system 114 may be integrated with the account services system 110, and/or the like. In some embodiments, operations or aspects of one or more of the components discussed above may be distributed amongst one or more other components. Any suitable arrangement and/or integration of the various systems and devices of the exemplary environment 100 may be used.

In the following disclosure, various acts may be described as performed or executed by a component from FIG. 1, such as the computing device 102, the interactive vehicle 105, one or more of the server-side systems 108, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2C:
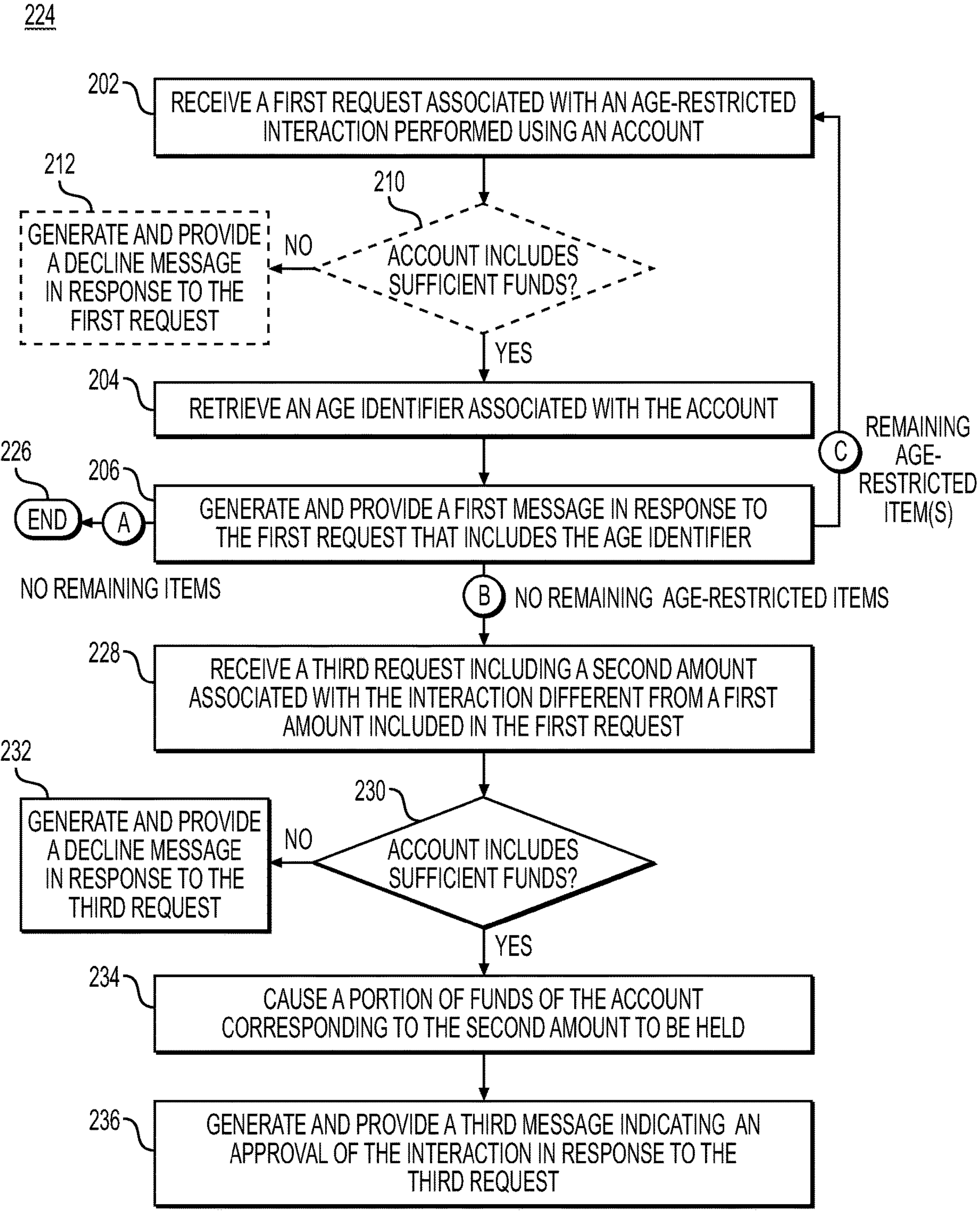

FIGS. 2A-2C depict flowcharts of exemplary processes 200, 208, 224 for authorizing an age-restricted interaction. One or more steps of the exemplary processes 200, 208, 224 may vary based on a type of the age-restricted interaction, whether the age restriction is removed, and/or whether there are any other items, including any other age-restricted items, associated with the interaction, as depicted in FIGS. 2A-2C. In some examples, the processes 200, 208, 224 described in each of FIGS. 2A-2C may be performed using one or more components in the environment 100 described in FIG. 1, such as the interaction authorization system 112.

FIG. 2A depicts a flowchart of the exemplary process 200 for authorizing an age-restricted interaction when the age-restricted interaction between a user and a merchant is an access-based or other nonpayment-related interaction performed using an account of the user. For example, a bar, club, or other similar venue or physical location associated with a merchant may set a minimum age for user entry (e.g., 18, 21, etc.). As another example, access to a website or other virtual location associated with a merchant may set a minimum user age, such as a website of an alcohol producer and/or distributer. Therefore, to allow the user access or entry, the merchant may first validate the user's age, where an age validation-enabled account as described herein may be one mechanism for performing the age validation. That is, the age validation-enabled account may be used as the certification mechanism 104 for age validation.

For purposes of the process 200 described with reference to FIG. 2A, the access-based interaction does not require payment of any funds from the user account to the merchant to obtain the access. If such payment is required to obtain access (e.g., payment of an entrance fee, cover charge, access fee, etc.), then interaction may instead be classified as an age-restricted payment transaction, and an alternative authorization process may be utilized, as described below with reference to FIGS. 2B and 2C.

At step 202, the process 200 may include for the interaction authorization system 112 to receive a first request associated with an age-restricted interaction performed using an account. The first request may be received from a terminal that is facilitating the interaction between a user of the account and a merchant, such as the computing device 102. The first request may be generated by the computing device 102 in response to the computing device 102 detecting (1) the age restriction associated with the interaction, and (2) the certification mechanism 104 for age validation associated with the account that is being used to perform the interaction. The certification mechanism 104 may be the status of the account as an age validation-enabled account.

As described in more detail below with reference to FIG. 3, in some examples, the computing device 102 may detect the certification mechanism 104 (e.g., detect the status of the account) based on input from the user indicating the account is an age validation-enabled account, where the input may be responsive to a prompt displayed on a display of the computing device 102. For example, when the entity or account services provider providing the age validation services is a financial institution of the user, a non-limiting exemplary prompt displayed may recite, "Your interaction is age-restricted or includes an age-restricted item. Would you like your financial institution to provide your age verification to complete the interaction?" In such examples, if the user accidentally or intentionally provides input indicating the account is an age validation-enabled account when the account is not an age validation-enabled account, the interaction authorization system 112 will fail to retrieve and provide the age identifier as described in later steps, and thus the computing device 102 may not be able to perform the age validation. In other examples, the computing device 102 may detect the certification mechanism 104 (e.g., detect the status of the account) based on a portion of the account identifier 103, such as the initial BIN portion, that indicates the account is an age validation-enabled account.

The first request may be a preauthorization request that prompts initiation of a first authorization process specific to age-restricted interactions to cause at least an age identifier to be retrieved and returned to the computing device 102. The first request may include an identifier of the account, such as the account identifier 103 that is optionally obtained from the interactive vehicle 105 (e.g., if presented to and read by the computing device 102) and/or otherwise received as input to the computing device 102. The first request may also include a merchant identifier of the merchant, a terminal identifier of the computing device 102, an amount associated with the interaction (if any), an indication of whether the interactive vehicle 105 associated with the account is present or absent, and/or biometric data of the user generated by the biometric scanning device of the interactive vehicle 105 if the account is also a biometric authentication-enabled account, among other similar examples. In this scenario, where the interaction is an access-based interaction, a null value or a value of 0 may be indicated for the amount associated with the interaction. Additionally, the merchant identifier may be a specific identifier to indicate the access-based interaction. In some examples, such an indication may trigger the interaction authorization system 112 to perform process 200 (e.g., as opposed to other processes described with respect to FIGS. 2B and 2C).

At step 204, the process 200 may include for the interaction authorization system 112 to retrieve an age identifier associated with the account. To retrieve an age identifier, the interaction authorization system 112 may use the account identifier 103 included in the first request to generate and submit a query to the account information data store 116 to obtain the age identifier. For example, upon receiving the query, the account information data store 116 may use the account identifier 103 to identify the account and obtain the age identifier from the user-related information stored in association with the account. The interaction authorization system 112 may receive the age identifier as part of a query result. In examples where the user accidentally or intentionally provides input indicating the account is an age validation-enabled account when the account is not an age validation-enabled account, the interaction authorization system 112 may fail to retrieve an age identifier.

In some examples, if the account is a biometric authentication-enabled account in addition to an age validation-enabled account, the first request may also include the biometric data of the user attempting to perform the interaction. In such examples, the interaction authorization system 112 may determine whether the biometric data of the user attempting to perform the interaction matches the biometric data stored in association with the account in the account information data store 116. For example, the interaction authorization system 112 may generate and submit a query to the account information data store 116 to obtain the stored biometric data to enable comparison. In some examples, a single query is generated to obtain the age identifier and the biometric data as part of a single query result. If the biometric data captured matches the stored biometric data, the process may proceed to step 206, described below. Otherwise, a decline message responsive to the first request may be generated and provided to the computing device 102 that indicates a failure to authenticate the identity of the user.

At step 206, the process 200 may include for the interaction authorization system 112 to generate a first message in response to the first request that includes the age identifier, and provide the first message to the computing device 102. For example, the first message may be a preauthorization message responsive to the preauthorization request. The first message may include an authorization number that identifies the first authorization process associated with the interaction. The computing device 102 may use the age identifier to determine whether a minimum age associated with the age-restricted interaction known by the computing device 102 is met.

In this scenario where the age-restricted interaction is an access-based interaction, the process 200 may end after step 206. For example, based on the specific merchant identifier included in the first request received at step 202 that indicates the access-based interaction, the interaction authorization system 112 may expect no further requests associated with this interaction to be received from the computing device 102. That is, because the computing device 102 only required an age identifier to be able to perform age validation and no other authorization indications from the interaction authorization system 112, such as sufficient funds, are needed, no further requests will be received as part of the first authorization process for this interaction.

FIGS. 2B and 2C depict flowcharts of the exemplary processes 208 and 224 for authorizing an age-restricted interaction when the interaction between a user and a merchant performed using an account of the user involves the transfer of funds from the user's account to the merchant in exchange for one or more age-restricted items. For brevity, this may also be referred to herein as a payment-related interaction.

FIG. 2B depicts a flowchart of the exemplary process 208 for authorizing an age-restricted interaction when the interaction is a payment-related transaction and an age of the user meets or exceeds a minimum age of each of one or more age-restricted items. The process 208 may include the same or similar steps 202, 204, and 206 of process 200 described in detail with reference to FIG. 2A, except the amount associated with the interaction included in the first request may now include a value corresponding to the interaction amount (e.g., an amount equal to a price of the restricted item(s) and any other items included in the interaction). This value may be also referred to as a first amount.

Additionally, now that a value other than a null or 0 value is included, the first request being a preauthorization request may indicate to the interaction authorization system 112 that a portion of the funds of the account corresponding to the amount associated with the interaction are not to be held yet. Because completion of the interaction is contingent on the age validation of the user, the funds are not held yet to prevent unnecessarily placing a hold on a larger portion of funds than ultimately needed to correspond to an amount of the interaction.

To provide an illustrative example, items included in the interaction may be an age-restricted alcoholic item associated with a minimum age of 21 that has a price of $18 and a food item that has a price of $10, resulting in a first interaction amount of $28. The user may have $30 in their account, which is enough to cover the first interaction amount. If the computing device 102 subsequently determines that the user is not 21 (e.g., based on the age identifier included in the first message generated at step 206), the alcoholic item may be voided or removed from the interaction resulting in a second interaction amount of $10. Because the user only has $30 in their account, if the first interaction amount of $28 is held prior to the age validation (causing only $2 to remain in the account), the user would no longer have sufficient funds to cover the second interaction amount of $10 due to the hold, which may remain on the account for a period of time. Therefore, to avoid this scenario, the corresponding portion of funds of the account are not held until after the age validation process is performed to allow for any changes to the transaction to be made, if needed, (e.g., to remove age-restricted items, if needed) so that a minimum necessary portion of funds is held.

In some examples, prior to and/or concurrently with step 204, optional step 210 may be performed as part of the process 208. At optional step 210, the interaction authorization system 112 may determine whether the account includes sufficient funds by determining whether a current balance of the account and/or a difference between the current balance and an account limit, depending on the account type, is equal to or greater than the first amount associated with the interaction. For example, the interaction authorization system 112 may use the account identifier 103 included in the first request to generate and submit a query to the account information data store 116 to obtain the current balance and/or limit of the account. For example, the account information data store 116 may use the account identifier 103 to identify the account and obtain the current balance and/or limit of the account stored in association with the account. The interaction authorization system 112 may receive the current balance and/or limit of the account as part of a query result, and determine whether the current balance and/or the difference between the current balance and the account limit is equal to or greater than the first amount.

If the current balance and/or the difference is not equal to or greater than the first amount, then the account may be determined to not include sufficient funds at optional step 210, and the process 208 may proceed to optional step 212. At optional step 212, the process 208 may include for the interaction authorization system 112 to generate a decline message in response to the first request that indicates the interaction is declined, and provide the decline message to the computing device 102. For example, the decline message may include a decline code indicating insufficient funds. The process 208 may then end. If the current balance and/or the difference is equal to or greater than the first amount, then the account may be determined to include sufficient funds at optional step 210, and the process 208 may continue with steps 204 and/or 206.

In examples where optional step 210 is performed, a single query may be generated and submitted to the account information data store 116 in order to obtain the current account balance and/or limit associated with optional step 210 and the age identifier associated with step 204 concurrently such that both are received as part of a single query result responsive to the single query. Additionally or alternatively, the determination of sufficiency of funds may be performed later in the process 208 after an additional request (e.g., a second request) is received from the computing device 102 subsequent to the age validation performed by the computing device 102, as described below.

Further, in some examples, if the account is a biometric authentication-enabled account in addition to an age validation-enabled account, the interaction authorization system 112 may determine the biometric data captured by a biometric scanning device integrated with the interactive vehicle 105 matches the biometric data stored in association with the account in the account information data store 116 prior to and/or concurrently with step 204. In such examples, the query may be generated such that the current account balance and/or limit, age identifier, and/or the biometric data may be received as part of a single query result. In other examples, this determination may be performed later in the process 208.

When the first message generated at step 206 (described with reference to FIG. 2A) is received by the computing device 102, the computing device 102 may use the age identifier to determine whether the user's age meets a minimum age associated with each of the one or more age-restricted items. If the user's age meets the minimum age associated with each of the one or more age-restricted items, no changes to the interaction are made (e.g., none of the age-restricted items are voided or removed) and the interaction authorization system 112 may receive a second request at step 214. The second request may be generated by the computing device 102 and include the same or similar types of data as the first request, and because no changes were made to the interaction, the first amount associated with the interaction included in the second request may be the same as the first amount included in the first request.

Because the first amount has not changed between the first and second request, the first authorization process associated with the interaction (and identified by the authorization number included in the first message) may be continued. However, the second request may be an authorization request indicating that the portion of the funds of the account corresponding to the amount associated with the interaction may now be held if the interaction is approved (e.g., if the account includes sufficient funds, among other evaluations).

Therefore, at step 216, the process 200 may include for the interaction authorization system 112 to determine whether the account includes sufficient funds to cover the first amount. The determination may be performed using the same or similar techniques described above with respect to optional step 210. If the account is determined not to include sufficient funds at step 216, the interaction authorization system 112 may generate a decline message in response to the second request, and provide the decline message to the computing device 102 at step 218. For example, the decline message may include a decline code indicating insufficient funds. In such instances, the user may remove or void one or more items from the interaction in an attempt to lower the amount of the interaction such that it is less than the account balance account balance and/or limit. If at least one of the items remaining is an age-restricted item, the process 208 may return to step 202.

In some examples, in addition to determining whether the account includes sufficient funds, the interaction authorization system 112 may perform one or more additional evaluations of the account that may result in generation of a decline message. Exemplary evaluations may include fraud-based evaluations. Additionally, if the account is a biometric-based authentication account, the additional evaluations may include determining whether biometric data captured by a biometric scanning device integrated with the interactive vehicle 105 matches the biometric data stored in association with the account in the account information data store 116.

If the account is determined to include sufficient funds at step 216, the process 208 may proceed to steps 220 and 222. At step 220, the interaction authorization system 112 may cause a portion of funds of the account corresponding to the first amount associated with the interaction to be held. At step 222, the interaction authorization system 112 may generate a second message indicating an approval of the interaction in response to the second request, and provide the second message to the computing device 102. The second message may include the same authorization number that identifies the first authorization process associated with the interaction included in the first message. Upon receipt of the second message, the computing device 102 may complete the interaction.

FIG. 2C depicts a flowchart of the exemplary process 224 for authorizing an age-restricted interaction when the interaction is a payment-related transaction and an age of the user does not meet or exceed a minimum age of at least one of one or more age-restricted items included in the transaction. The process 224 may include the same or similar steps 202, 204, 206, and optional steps 210 and 212 of the process 208 described in detail with reference to FIG. 2B.

However, when the first message generated at step 206 is received by the computing device 102, the computing device 102 may use the age identifier to determine the user's age does not meet a minimum age associated with at least one of the one or more age-restricted items included in the interaction. The at least one age-restricted item that the user's age does not meet the minimum age for may be voided and/or otherwise removed as an item from the interaction. The process 224 may then proceed along one of Path A, Path B, or Path C depending on whether there are any other items remaining in the interaction, and if so, whether those remaining items include other age-restricted items.

As one example, if there are no remaining items associated with the interaction, then the process 224 may proceed along Path A and end at step 226. There may be no remaining items if the least one age-restricted item that the user's age does not meet the minimum age for was the only item associated with the interaction, for example.

As another example, if there are one or more remaining items associated with the interaction, and none of the remaining items are age-restricted items, the process 224 may proceed along Path B to step 228. At step 228, the process 224 may include for the interaction authorization system 112 to receive a third request from the computing device 102 that includes a second amount associated with the interaction different from the first amount that was included in the first request. The second amount may be different because one or more age-restricted items were voided and/or otherwise removed from the interaction. Accordingly, the second amount may be the first amount less the price of the one or more age-restricted items.

Because of the difference in the first and second amounts included in the first and third requests, the first authorization process associated with the interaction (and identified by the authorization number included in the first message at step 206) may cease, and a separate, second authorization process may be initiated by the third request. The second authorization process may be a general authorization process applicable to any type of interaction (e.g., that is not specific to age-restricted interactions). The third request may be an authorization request that indicates to the interaction authorization system 112 that a portion of the funds of the account corresponding to the second amount associated with the interaction may be held if the interaction is approved (e.g., if the account includes sufficient funds, among other evaluations).

Therefore, at step 230, the process 224 may include for the interaction authorization system 112 to determine whether the account includes sufficient funds to cover the second amount. The determination may be performed using the same or similar techniques described above with respect to optional step 210, except that the account balance and/or limit is considered relative to the second amount rather than the first amount. If the account is determined not to include sufficient funds at step 230, the interaction authorization system 112 may generate a decline message in response to the second request, and provide the decline message to the computing device 102 at step 232. For example, the decline message may include a decline code indicating insufficient funds.

In some examples, in addition to determining whether the account includes sufficient funds, the interaction authorization system 112 may perform one or more additional evaluations of the account that may result in generation of a decline message. Exemplary evaluations may include fraud-based evaluations. Additionally, if the account is a biometric-based authentication account, the additional evaluations may include determining whether biometric data captured by a biometric scanning device integrated with the interactive vehicle 105 matches the biometric data stored in association with the account in the account information data store 116.

If the account is determined to include sufficient funds at step 230, the process 224 may proceed to steps 234 and 236. At step 234, the interaction authorization system 112 may cause a portion of funds of the account corresponding to the second amount associated with the interaction to be held. At step 236, the interaction authorization system 112 may generate a third message indicating an approval of the interaction in response to the third request, and provide the third message to the computing device 102. The third message may be an authorization message that includes a new authorization number associated with the second authorization process for the interaction. Upon receipt of the third message, the computing device 102 may complete the interaction based on the approval.

In a further example, if there are one or more remaining items associated with the interaction, and at least one of the remaining items is an age-restricted item, the process 224 may proceed along Path C and return to step 202 to repeat the first authorization process. Steps 202, 204, 206, and/or optional steps 210 and 212 may be performed. If the age restriction for the remaining age-restricted item is removed by the computing device 102, steps 214, 216, 218, 220, and/or 222 may be performed as described with reference to FIG. 2B. If the age restriction for the remaining age-restricted item is maintained by the computing device 10, steps of one of Path A, B, or C may be followed, as described with reference to FIG. 2C.

In any of the exemplary processes 200, 208, and 224 described above with reference to FIGS. 2A-2C, the interaction authorization system 112 may generate one or more alerts or notifications to provide to the user. For example, using the account identifier 103, the interaction authorization system 112 may retrieve contact information (e.g., a telephone number, electronic mail address, etc.) for the user of the account that is stored in the account information data store 116. Using the contact information, interaction authorization system 112 may send an alert or notification over the phone, text message, electronic mail, and/or push notification, among other similar examples, to indicate that the account has been used for age validation. Such an alert or notification may be valuable to account holders who have younger children within their household, for example, that may potentially have access to the account identifier 103 and/or interactive vehicle 105 and may attempt to use the account for age validation purposes. Additionally or alternatively, the user may be notified of the use of the account for age validation through indicators displayed on statements associated with the account that are provided to the user at predefined time intervals. For example, a monthly account statement listing each of the interactions occurring the previous month may include an asterisk, flag, or other similar visual indicator displayed in association with any of the listed interactions that were age-restricted interactions in which the account was used for age validation purposes.

Accordingly, certain embodiments may perform authorization of age-restricted interactions. The processes 200, 208, and 224 described above are provided merely as an example, and may include additional, fewer, different, or differently arranged steps than depicted in FIGS. 2A-2C.

Figure 3:
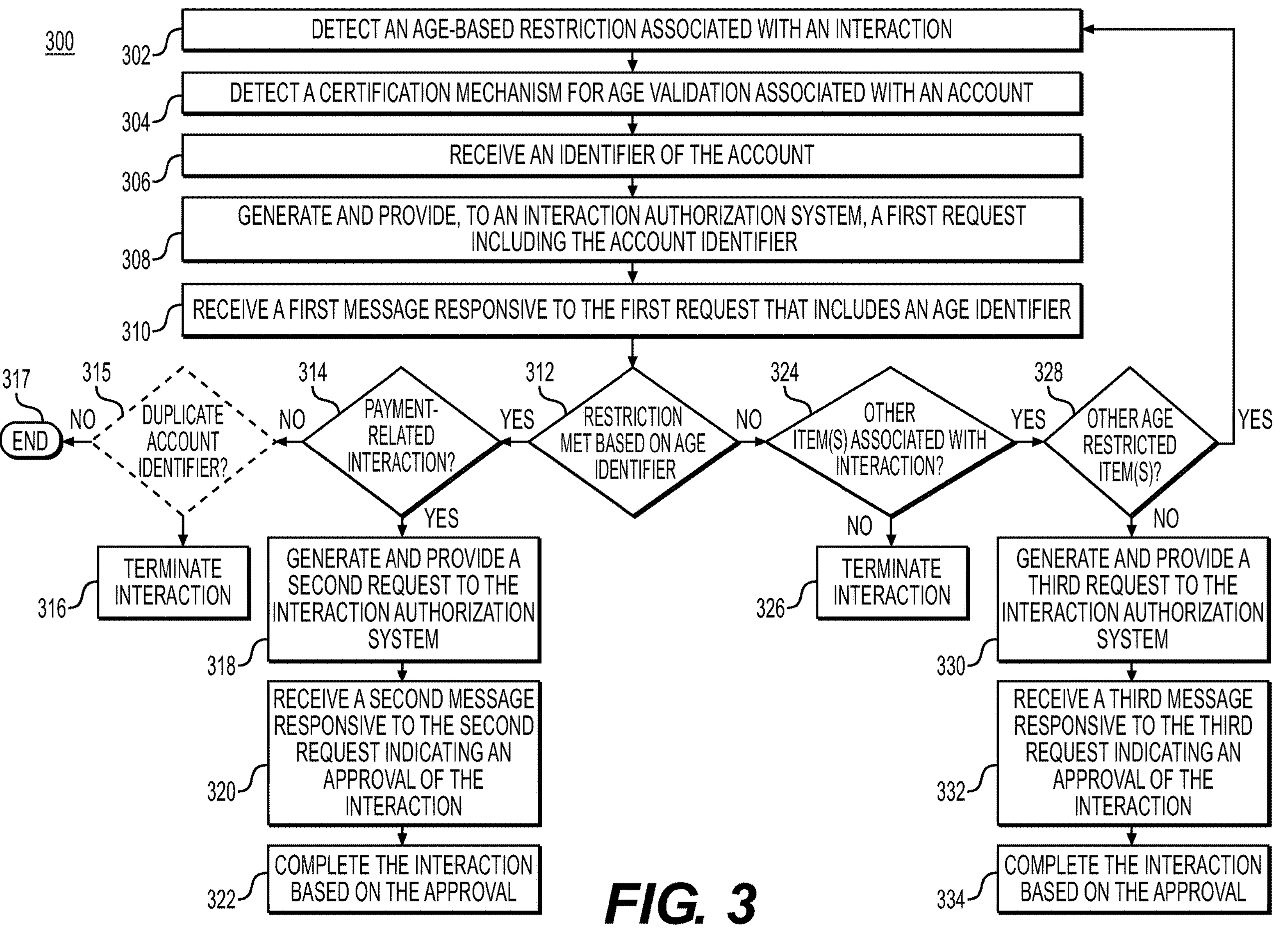
FIG. 3 depicts a flowchart of an exemplary process implemented by a terminal for facilitating an age-restricted interaction and an authorization thereof, according to certain embodiments.

FIG. 3 depicts a flowchart of an exemplary process 300 for facilitating an age-restricted interaction and an authorization thereof. In some examples, the process 300 may be performed using one or more components in the environment 100 described in FIG. 1, such as the computing device 102 serving as the terminal to facilitate an interaction between a user and a merchant.

At step 302, the process 300 may include for the computing device 102 to detect an age-based restriction associated with the interaction. In response to detecting the age-based restriction, the computing device 102 may place a restriction on the interaction (e.g., a hold) that is required to be removed through age validation and/or, in some instances, by removing or voiding an item from the interaction before allowing completion of the interaction.

In some examples, the age-based restriction detected may include one or more age-restricted items that the user is attempting to purchase in a payment-related interaction. To provide an exemplary scenario, the computing device 102 may be integrated with a self-checkout system. Logic of the computing device 102 may store a list of items sold by the merchant that are age-restricted items and a minimum age associated with each of the age-restricted items. For example, in a grocery store, the list may include alcohol, tobacco, lottery tickets, particular over the counter medications, etc. and associated minimum ages of 21, 18, etc. Therefore, when the user utilizes the self-checkout system to scan or otherwise enter a barcode identifier of an age-restricted item, such as alcohol, the computing device 102 may detect that the item is an age-restricted item from the list, and place a restriction on the interaction until age validation is performed and/or the age-restricted item is removed or voided from the interaction.

In other examples, the age-based restriction may be an access-based age restriction. To provide one exemplary scenario, the computing device 102 may be integrated with an automated access system, such as an automatic turnstile, that allows entry into a physical location of a merchant having a minimum age requirement for access, such as a 21 year old and up club. The computing device 102 may store the minimum age, and for each attempted entry by a user through the automated access system, the computing device may detect the age-based restriction causing the restriction to be placed on the interaction (e.g., the turnstile to be locked or otherwise not rotate) until age validation is performed.

At step 304, the process 300 may include for the computing device 102 to detect the certification mechanism 104 for age validation associated with an account of the user. The detection of the certification mechanism 104 may be a detection that the account is an age validation-enabled account that is usable as the certification mechanism 104 for age validation. The account status or type being the age validation-enabled account may be identified in a variety of ways. In one example, in response to detecting the age-based restriction at step 302, the computing device 102 may generate a user interface for presentation to the user via a display associated with the computing device 102. The user interface may include a prompt for the user to select use of an age validation-enabled account to perform the age validation or to otherwise request human assistance for age validation (e.g., as is performed conventionally). In another example, the age validation-enabled account may be identified based on the initial BIN portion of an identifier of the account (e.g., the identifier received at step 306).

At step 306, the process 300 may include for the computing device 102 to receive an identifier of the account, such as the account identifier 103 (e.g., an account number). In some examples, the user may possess the interactive vehicle 105 that includes the account identifier 103 and/or data representative of the account identifier 103 stored therein (e.g., in a chip and/or in a magnetic stripe). In such examples, the user may present the interactive vehicle 105 to the computing device 102 by inserting the chip portion, sliding the magnetic stripe, and/or tapping the interactive vehicle 105 (e.g., if the interactive vehicle 105 is NFC-enabled) to the computing device 102 to transmit the account identifier 103 to the computing device 102. In other examples, the account identifier 103 may be provided as input by the user to the computing device 102. For example, a representative of the merchant and/or the user may enter the account identifier 103, which may be visually present on the interactive vehicle 105 into the computing device 102. As another example, if the interaction is an online transaction, the user may manually enter the account identifier 103 into a text box included within a user interface of a payment portal or cart of the merchant. Alternatively, the account identifier 103 may be automatically captured by scanning the account identifier 103 using a camera of the computing device 102 to capture an image, where the computing device 102 may use optical character recognition techniques to convert the image of the account identifier 103 to text.

At step 308, the process 300 may include for the computing device 102 to generate a first request including the account identifier 103, and provide the first request to the interaction authorization system 112. The first request may be generated as a preauthorization request based on the detection of the certification mechanism 104 at step 304. The account identifier 103 may be represented in one data field of the first request. The first request may also include a plurality of other data fields representing a merchant identifier of the merchant, a terminal identifier of the computing device 102, a first amount associated with the interaction (if any), an indication of whether the interactive vehicle 105 associated with the account is present or absent, and/or biometric data of the user generated by the biometric scanning device of the interactive vehicle 105 if the account is also a biometric authentication-enabled account. In scenarios where the interaction is an access-based interaction, a null value or a value of 0 may be indicated for the first amount in the first request. Additionally, the merchant identifier may be a specific identifier to indicate the access-based interaction to the interaction authorization system 112. Optionally, one of the data fields of the first request may explicitly represent whether or not an age validation is being requested. For example, a value of 1 in this optional data field may indicate to the interaction authorization system 112 that an age validation is being requested to cause the interaction authorization system 112 to return an age identifier in a responsive first message, as described in step 310 below. In other examples, the preauthorization request may automatically trigger the interaction authorization system 112 to return an age identifier without such an explicit data field included in the preauthorization request.

At step 310, the process 300 may include for the computing device 102 to receive a first message responsive to the first request from the interaction authorization system 112 that includes an age identifier of the user. The age identifier may be the user's DOB. At step 312, the process 300 may include the computing device 102 determining whether the age-based restriction is met based on the age identifier. For example, utilizing the logic stored thereon, the computing device 102 may compute the user's age based on the DOB received, and determine whether the user's age meets the minimum age associated with the age-based restriction detected at step 302.

If at step 312 the age-based restriction is met, the process 300 may include the computing device 102 determining whether the interaction is a payment-related interaction at step 314. In some examples, the computing device 102 may determine whether the interaction is a payment-related interaction based on whether any amount is associated with the interaction. Additionally, when the age-based restriction is met, the restriction placed on the interaction by the computing device 102 may be removed.

If at step 314 the interaction is not a payment-related interaction (e.g., the interaction is instead an access-based interaction), the process 300 may perform optional step 315, to determine whether the account identifier 103 is a duplicate account identifier (e.g., by performing a duplication check). The duplication check may prevent two different users, one of whom may not meet the age restriction, from using the same account identifier 103 and/or the interactive vehicle 105 of the other user who does meet the age restriction to perform age validation to gain access. This duplication check may be particularly advantageous when the computing device 102 is integrated with an automated access system, such as an automatic turnstile, that could enable the user to simply pass off the account identifier 103 and/or interactive vehicle 105 to another user for use to gain entry.

To perform the duplication check, the computing device 102 may store a list of account identifiers having been used for age validation over a predefined period of time (e.g., account identifiers received within the past 3, 6, 12, 24 hours, etc.). The computing device 102 may reference this list to determine whether or not the current account identifier 103 matches any of the account identifiers included in the list. If the account identifier 103 does match, the account identifier 103 may be determined to be a duplicate, and the interaction may be terminated by the computing device 102 at step 316. If the account identifier 103 does not match, the account identifier may be determined to be a nonduplicate, and the process may end at step 317 as no further information is needed from the interaction authorization system 112. If the optional step 315 is not performed, the process may instead directly end at step 317. Additionally, while the duplication check is described herein as being performed when the interaction is an access-based interaction, in other examples, the duplication check may optionally be performed for payment-related interactions as well.

If at step 314, the interaction is determined to be a payment-related interaction, the process 300 may proceed to steps 318, 320, and 322. For example, at step 318, the computing device 102 may generate and provide a second request to the interaction authorization system 112. The second request may be an authorization request that includes the same first amount associated with the interaction as included in the first request generated at step 308 because the age restriction was met and no changes to the interaction (e.g., voids or removals) had to be made. At step 320, the computing device 102 may receive a second message responsive to the second request from the interaction authorization system 112 that indicates an approval of the interaction (e.g., upon a determination that the user has sufficient funds as described in detail with reference to FIG. 2B). At step 322, the computing device 102 may complete the interaction based on the approval.

Alternatively, returning back to step 312, if the age-based restriction is determined to not be met, the process 300 may include the computing device 102 determining whether one or more other items are associated with the interaction at step 324. In instances when the age-based restriction is determined to not be met and the age-based restriction is associated with an item for purchase, the age-restricted item may be voided and/or removed from the interaction. For example, a representative of the merchant may be notified and prompted to interact with the computing device 102 in order to void and/or remove the age-restricted item from the interaction. The determination at step 324 may be to determine whether any items remain following such void and/or removal processes.

If no other items are determined to be associated with the interaction at step 324, the computing device 102 may terminate the interaction at step 326. For example, if the interaction is an access-based interaction to gain access or entry to a location, there may be no other items associated with the interaction. Thus, if the user is not old enough to gain access or entry, the interaction may be terminated. As another example, if the user is only purchasing one item, such as a lottery ticket, and the user is not old enough to purchase, the item may be voided or removed from the interaction, and the interaction may be subsequently terminated as there are no other items remaining.

If one or more other items are determined to be associated with the interaction at step 324, the process 300 may include the computing device 102 further determining whether any of the other items associated with the interaction are age-restricted items at step 328. If at step 328, none of the other items are age-restricted items, the process 300 may proceed to steps 330, 332, and 334. For example, at step 330, the computing device 102 may generate and provide a third request to the interaction authorization system 112. The third request may be an authorization request. The third request may include a second amount different from the first amount included in the first request generated at step 308. The second amount may be different due to the voiding and/or removal of the age-restricted item from the interaction causing the second amount to be lower than the first amount, for example. At step 332, the computing device 102 may receive a third message responsive to the third request from the interaction authorization system 112 that indicates an approval of the interaction (e.g., upon a determination that the user has sufficient funds as described in detail with reference to FIG. 2C). At step 334, the computing device 102 may complete the interaction based on the approval.

If at step 328, one or more other age-restricted items are determined to be associated with the interaction, the process 300 may return to step 302. For example, if the user is attempting to purchase both alcohol and tobacco, but the user is determined to not be old enough to purchase the alcohol at step 312 (e.g., the alcohol was voided or removed from the interaction), the process 300 may be repeated to perform an age validation for the tobacco.

Accordingly, certain embodiments may perform authorization of age-restricted interactions. The process 300 described above is provided merely as an example, and may include additional, fewer, different, or differently arranged steps than depicted in FIG. 3.

In general, any process or operation discussed in this disclosure that is understood to be computer-implementable, such as the processes or operations depicted in FIGS. 2A-2C and FIG. 3, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 4:
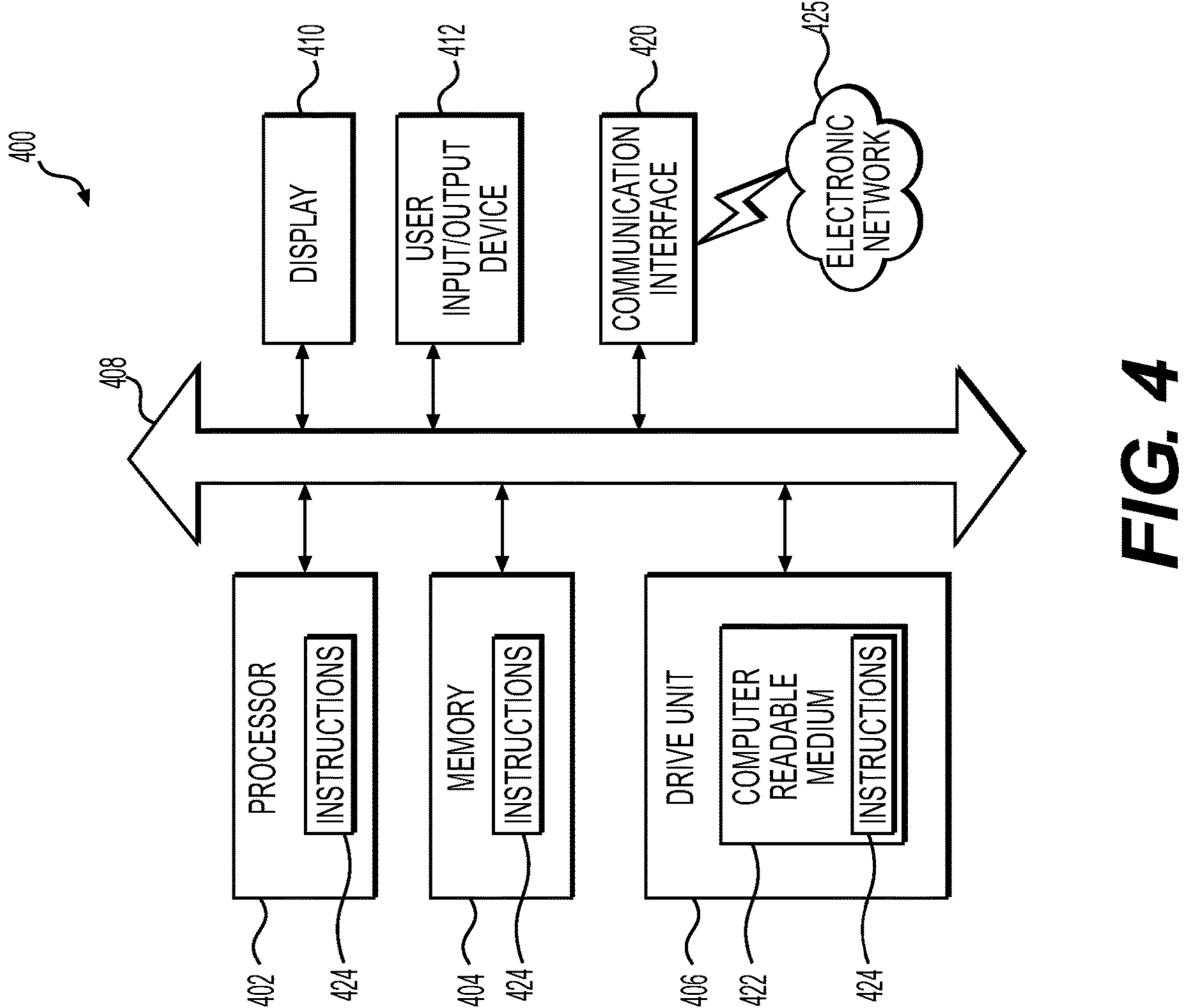
FIG. 4 depicts an example of a computer, according to certain embodiments.

FIG. 4 depicts an example of a computer 400, according to certain embodiments. FIG. 4 is a simplified functional block diagram of a computer 400 that may be configured as a device for executing processes or operations depicted in, or described with respect to, FIGS. 2A-2C and FIG. 3, according to exemplary embodiments of the present disclosure. For example, the computer 400 may be configured as one of the computing devices 102, the interactive vehicle 105, one of the server-side systems 108, and/or another device according to exemplary embodiments of this disclosure. In various embodiments, any of the systems herein may be a computer 400 including, e.g., a data communication interface 420 for packet data communication. The computer 400 may communicate with one or more other computers 400 using the electronic network 425. The electronic network 425 may include a wired or wireless network similar to the network 106 depicted in FIG. 1.

The computer 400 also may include a central processing unit ("CPU"), in the form of one or more processors 402, for executing program instructions 424. The program instructions 424 may include instructions for running one or more operations associated with facilitating interactions, such as generating and routing preauthorization and/or authorization requests, as well as enabling and/or denying completion of interactions based on preauthorization and/or authorization messages received in responsive to the requests (e.g., if the computer 400 is the computing device 102). The program instructions 424 may include instructions for transmitting account-related data to perform an interaction (e.g., if the computer 400 is the interactive vehicle 105). The program instructions 424 may include instructions for running one or more operations of the server-side systems 108, such as authorization operations (e.g., if the computer 400 is a server device or other similar computing device of one or more of the respective server-side systems 108). The computer 400 may include an internal communication bus 408, and a drive unit 406 (such as read-only memory (ROM), hard disk drive (HDD), solid-state disk drive (SDD), etc.) that may store data on a computer readable medium 422, although the computer 400 may receive programming and data via network communications. The computer 400 may also have a memory 404 (such as random access memory (RAM)) storing instructions 424 for executing techniques presented herein, although the instructions 424 may be stored temporarily or permanently within other modules of computer 400 (e.g., processor 402 and/or computer readable medium 422). The computer 400 also may include user input and output ports 412 and/or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method, comprising:

receiving, from a computing device that an interactive vehicle associated with an account is interacting with to perform an interaction, a first request generated by the computing device based on the computing device detecting (1) an age restriction associated with the interaction, and (2) the account is a certification mechanism for age validation, wherein the first request includes (1) an account identifier stored by the interactive vehicle and read by the computing device, and (2) a first amount associated with the interaction;

using the account identifier included in the first request to identify account information stored in a data store, the account information including an age identifier of a holder of the account;

receiving the age identifier from the account information identified in the data store;

generating and providing, to the computing device, a first message responsive to the first request that includes the age identifier, wherein the computing device determines whether (i) an age of the holder of the account meets the age restriction for an age-restricted item associated with the interaction based on the age identifier and (ii) the account identifier is a duplicate of one of a plurality of account identifiers of a plurality of accounts having been used for age validation over a predefined period of time that are stored in a list on the computing device;

upon determining by the computing device that the age of the holder of the account meets the age restriction for the age-restricted item and the account identifier is not a duplicate;

receiving a second request from the computing device; and generating and providing, to the computing device, a second message responsive to the second request indicating an approval of the interaction; and upon determining by the computing device that the age of the holder of the account does not meet the age restriction for the age-restricted item and one or more items remain associated with the interaction that are not age-restricted:

receiving a third request from the computing device, the third request including the account identifier and a second amount associated with the interaction different from the first amount associated with the interaction, the second amount resulting from removal of the age-restricted item from the interaction; and based on the second amount included in the third request being different from the first amount, causing a portion of funds of the account corresponding to the second amount to be held and generating and providing, to the computing device, a third message responsive to the third request indicating an approval of the interaction.

2. The computer-implemented method of claim 1, wherein the second request includes the first amount associated with the interaction, and the method further comprises:

in response to receiving the second request, determining the first amount included in the second request is the same as the first amount included in the first request; and based on the determination of the same first amount, causing a portion of funds of the account corresponding to the first amount to be held and generating the second message.

3. The computer-implemented method of claim 2, further comprising:

determining the funds of the account are sufficient to cover the first amount; and based on the determinations of the same first amount and the sufficient funds, causing (1) the portion of funds of the account corresponding to the first amount to be held, and (2) the second message to be generated.

4. The computer-implemented method of claim 1, further comprising:

in response to receiving the first request, determining funds of the account are sufficient to cover the first amount; and based on the determination, generating the first message.

5. The computer-implemented method of claim 1, further comprising:

generating and providing a notification to the holder of the account to indicate the approval of the interaction having the age restriction associated therewith.

6. The computer-implemented method of claim 1, wherein the interaction is associated with an exchange of one or more age-restricted items of a merchant for a portion of funds of the account.

7. The computer-implemented method of claim 1, wherein the interaction is associated with age-restricted access to a virtual location or a physical location of a merchant.

8. The computer-implemented method of claim 1, wherein the computing device detects the account is the certification mechanism for age validation based on an input received in response to a prompt displayed on a display of the computing device, the input indicating the account is an age validation-enabled account that is usable as the certification mechanism for age validation.

9. The computer-implemented method of claim 1, wherein the computing device detects the account is the certification mechanism for age validation based on a portion of the account identifier, the portion of the account identifier indicating the account is an age validation-enabled account that is usable as the certification mechanism for age validation.

10. A computer-implemented method, comprising:

receiving, from a computing device that an interactive vehicle associated with an account is interacting with to perform an interaction, a first request generated by the computing device to initiate a first authorization process based on the computing device detecting (1) one or more age-restricted items associated with the interaction, and (2) the account is a certification mechanism for age validation, wherein the first request includes (1) an account identifier stored by the interactive vehicle and read by the computing device, and (2) a first amount associated with the interaction;

using the account identifier included in the first request to identify account information stored in a data store, the account information including an age identifier of an account holder of the account;

receiving the age identifier from the account information identified in the data store;

generating and providing, to the computing device, a first message responsive to the first request that includes the age identifier, wherein the computing device determines (i) whether an age of the account holder meets a minimum age for each of the one or more age-restricted items based on the age identifier and (ii) whether the account identifier is a duplicate of one of a plurality of account identifiers of a plurality of accounts having been used for age validation over a predefined period of time that are stored in a list on the computing device; and determining whether to continue with the first authorization process based on an indication of the determination of (i) whether the age of the account holder meets the minimum age for each of the one or more age-restricted items received from the computing device and (ii) whether the account identifier is a duplicate;

wherein the first authorization process is continued when, in response to the computing device determining the minimum age is met and the account identifier is not a duplicate, a second request including the same first amount associated with the interaction included in the first request is received as the indication from the computing device, and continuing the first authorization process includes:

causing a portion of funds of the account corresponding to the first amount to be held, and generating and providing a second message to the computing device responsive to the second request indicating an approval of the interaction;

wherein the first authorization process is ceased when, in response to the computing device determining the minimum age is not met for at least one of the one or more age-restricted items or the account identifier is a duplicate, no request or a third request is received as the indication from the computing device; and wherein a second authorization process is initiated when, in response to the computing device determining the minimum age is not met for each of the one or more age-restricted items and one or more items remain associated with the interaction that are not age restricted, the third request is received, the second authorization process including:

determining a second amount associated with the interaction included in the third request is different from a first amount associated with the interaction, the second amount resulting from removal of each of the one or more age-restricted items from the interaction; and based on the second amount included in the third request being different from the first amount, causing a portion of funds of the account corresponding to the second amount to be held and generating and providing, to the computing device, a third message responsive to the third request indicating an approval of the interaction.

11. The computer-implemented method of claim 10, wherein, when two age-restricted items are detected and the computing device determines that the minimum age is not met for one of the two age-restricted items, the method further comprises:

receiving, from the computing device, a fourth request to initiate another performance of the first authorization process, wherein the fourth request includes the account identifier and a third amount associated with the interaction different from the first amount, the third amount resulting from a removal of the one of the two age-restricted items from the interaction;

using the account identifier included in the fourth request to identify the account information stored in the data store to obtain the age identifier of the account holder from the data store;

generating and providing, to the computing device, a fourth message responsive to the fourth request including the age identifier, wherein the computing device determines that the age of the account holder meets a minimum age for the other one of the two age-restricted items remaining based on the age identifier:

receiving, from the computing device, a fifth request including the third amount associated with the interaction; and based on the third amount included in the fifth request being the same as the third amount included in the fourth request, continuing the other performance of the first authorization process by:

causing a portion of funds of the account corresponding to the third amount to be held, and generating and providing, to the computing device, a fifth message responsive to the fifth request indicating an approval of the interaction.

12. The computer-implemented method of claim 11, wherein the other performance of the first authorization process further includes determining the funds of the account are sufficient to cover the third amount responsive to at least one of receiving the fourth request or receiving the fifth request.

13. The computer-implemented method of claim 10, wherein, when the computing device determines that the minimum age is not met for at least one of the one or more age-restricted items and no items remain associated with the interaction, no request is received as the indication from the computing device, and the method further comprises:

ceasing to perform any further authorization process associated with the interaction.

14. A method implemented on a computing device, the method comprising:

detecting an age-based restriction associated with an interaction, the age-based restriction including an age-restricted item;

detecting an account used to perform the interaction is a certification mechanism for age validation, wherein an authorized user of the account is issued an interactive vehicle for use in performing interactions with the account, the interactive vehicle storing an account identifier of the account;

receiving, from the interactive vehicle in communication with the computing device, the account identifier of the account stored in the interactive vehicle;

generating and providing a first request to an interaction authorization system that includes the account identifier and a first amount associated with the interaction;

receiving, from the interaction authorization system, a first message responsive to the first request that includes an age identifier of the authorized user of the account;

determining whether an age of the authorized user of the account meets the age-based restriction based on the age identifier;

referencing a list stored on the computing device, the list including a plurality of account identifiers of a plurality of accounts having been used for age validation over a predefined period of time;

determining whether the account identifier is a duplicate of one of the plurality of account identifiers included in the list;

upon determining the age of the authorized user of the account meets the age-based restriction and the account identifier is not a duplicate;

generating and providing a second request to approve the interaction to the interaction authorization system;

receiving, from the interaction authorization system, a second message responsive to the second request indicating an approval of the interaction; and completing the interaction based on the approval; and upon determining the age of the authorized user of the account does not meet the age-based restriction based on the age-restricted item and one or more items remain associated with the interaction that are not age-restricted:

generating and providing, to the interaction authorization system, a third request including the account identifier and a second amount associated with the interaction different from the first amount associated with the interaction, the second amount resulting from removal of the age-restricted item from the interaction; and receiving, from the interaction authorization system, a third message responsive to the third request indicating an approval of the interaction, wherein the interaction authorization system generates the third message based on the second amount included in the third request being different from the first amount, and causes a portion of funds of the account corresponding to the second amount to be held.

15. The method of claim 14, wherein detecting the account used to perform the interaction is the certification mechanism for age validation comprises:

generating and displaying, on a display of the computing device, a prompt to select use of an age validation-enabled account as the certification mechanism for age validation or request assistance for age validation; and responsive to the prompt, receiving a selection to use the age validation-enabled account as the certification mechanism.

16. The method of claim 14, wherein a portion of the account identifier of the account includes a bank identification number (BIN), and detecting the account used to perform the interaction is the certification mechanism for age validation comprises:

determining the portion of the account identifier corresponds to a BIN of an issuer of the account that is associated with age validation-enabled accounts that are usable as the certification mechanism for age validation.

17. The computer-implemented method of claim 1, wherein the first request is a preauthorization request indicating the interaction is contingent on the age validation, the second request is an authorization request, and the method further comprises:

in response to receiving the first request, at least temporarily preventing placement of a hold on a portion of funds of the account corresponding to an amount of the interaction; and in response to receiving the second request, causing the placement of the hold.

18. The computer-implemented method of claim 1, wherein the interactive vehicle comprises one of a card, a token, or a key.

19. The computer-implemented method of claim 1, wherein the interactive vehicle includes a biometric scanning device, the first request includes biometric data, captured by the biometric scanning device, of a user in possession of the interactive vehicle and attempting to perform the interaction, and the method further comprises:

receiving, from the account information identified in the data store, known biometric data of the holder of the account;

determining the biometric data included in the first request matches the known biometric data, the match indicating the user in possession of the interactive vehicle and attempting to perform the interaction is the holder of the account; and generating the first message in response to determining the match.

* * * * *